US009115844B2

(12) United States Patent
Lau

(10) Patent No.: US 9,115,844 B2
(45) Date of Patent: Aug. 25, 2015

(54) STAND FOR SUPPORTING PORTABLE ELECTRONIC DISPLAY DEVICE

(75) Inventor: Terence BoonKheng Lau, Ashfield (AU)

(73) Assignee: FLOTSAM (HK) LIMITED, Kowloon (HK)

( * ) Notice: Subject to any disclaimer, the term of this patent is extended or adjusted under 35 U.S.C. 154(b) by 13 days.

(21) Appl. No.: 13/811,775

(22) PCT Filed: Jul. 27, 2011

(86) PCT No.: PCT/CN2011/077660
§ 371 (c)(1),
(2), (4) Date: Jan. 23, 2013

(87) PCT Pub. No.: WO2012/013144
PCT Pub. Date: Feb. 2, 2012

(65) Prior Publication Data
US 2013/0119225 A1    May 16, 2013

Related U.S. Application Data

(60) Provisional application No. 61/368,088, filed on Jul. 27, 2010.

(51) Int. Cl.
*F16M 11/00* (2006.01)
*G06F 1/16* (2006.01)

(52) U.S. Cl.
CPC ............. *F16M 11/00* (2013.01); *G06F 1/1632* (2013.01); *Y10T 29/49826* (2015.01)

(58) Field of Classification Search
USPC ............. 248/346.2; 108/43; D6/406.3, 406.4, D6/406.6; 220/603
See application file for complete search history.

(56) References Cited

U.S. PATENT DOCUMENTS

| | | | | | |
|---|---|---|---|---|---|
| 4,052,944 A | * | 10/1977 | Jennings | .......................... | 108/43 |
| 5,582,382 A | * | 12/1996 | Pan-Yang | ...................... | 248/456 |
| 5,732,849 A | * | 3/1998 | Brooks | .......................... | 220/603 |
| D415,532 S | * | 10/1999 | Tobin | .............................. | D19/91 |
| 6,041,715 A | * | 3/2000 | Jarke et al. | ....................... | 108/43 |

(Continued)

FOREIGN PATENT DOCUMENTS

CN        2450116 Y       9/2001
CN        202100895 U  *  1/2012   ............. F16M 11/00

OTHER PUBLICATIONS

International Search Report (PCT/ISA/210) issued on Nov. 3, 2011, by the Chinese Patent Office as the International Searching Authority for International Application No. PCT/CN2011/077660.

(Continued)

*Primary Examiner* — Alfred J Wujciak
(74) *Attorney, Agent, or Firm* — Buchanan Ingersoll & Rooney PC

(57) ABSTRACT

The present invention provides an electronic display device stand which enables adjustment to, support at and maintenance of, the orientation of a supported electronic display device. The stand preferably comprises an engagement portion which supports and engages the portable electronic display device; and a support portion which allows adjustability of the orientation and maintenance of the device at the desired user defined orientation. The support portion includes a deformable mass portion which can be deformed by a user, and maintains support of the display device at the user defined orientation.

18 Claims, 13 Drawing Sheets

(56) References Cited

U.S. PATENT DOCUMENTS

| | | | | |
|---|---|---|---|---|
| 6,050,200 | A | * | 4/2000 | Sullins et al. ................... 108/43 |
| 6,517,040 | B1 | | 2/2003 | Wen |
| 6,986,308 | B1 | * | 1/2006 | King et al. ...................... 108/43 |
| 7,215,538 | B1 | | 5/2007 | Chen et al. |
| 7,976,228 | B2 | * | 7/2011 | Lambert ....................... 396/428 |
| 2009/0041437 | A1 | * | 2/2009 | Calvin .......................... 386/126 |
| 2011/0210224 | A1 | * | 9/2011 | Piccolo ...................... 248/346.2 |
| 2012/0060724 | A1 | * | 3/2012 | Doss et al. ..................... 108/43 |

OTHER PUBLICATIONS

Written Opinion (PCT/ISA/237) issued on Nov. 3, 2011, by the Chinese Patent Office as the International Searching Authority for International Application No. PCT/CN2011/077660.

Notification Concerning Transmittal of International Preliminary Report on Patentability (Forms PCT/IB/326 and PCT/IB/373) and the Written Opinion of the International Searching Authority (Form PCT/ISA/237) dated Feb. 7, 2013, issued in corresponding International Application No. PCT/CN2011/077660. (7 pages).

* cited by examiner

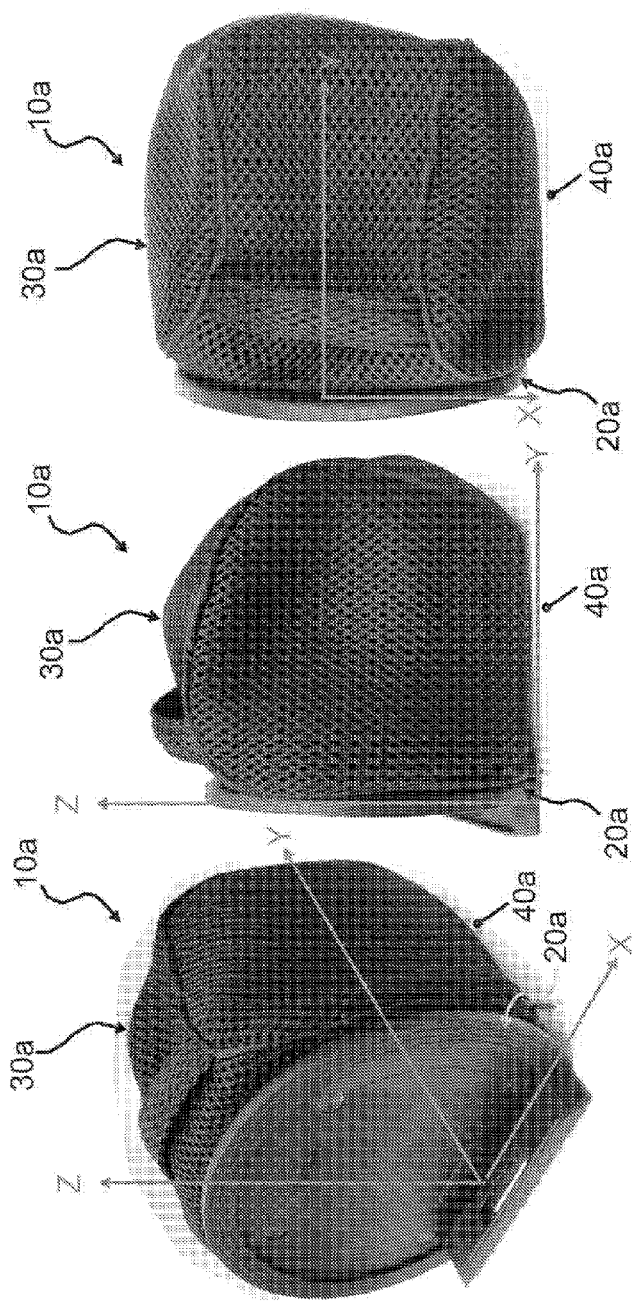

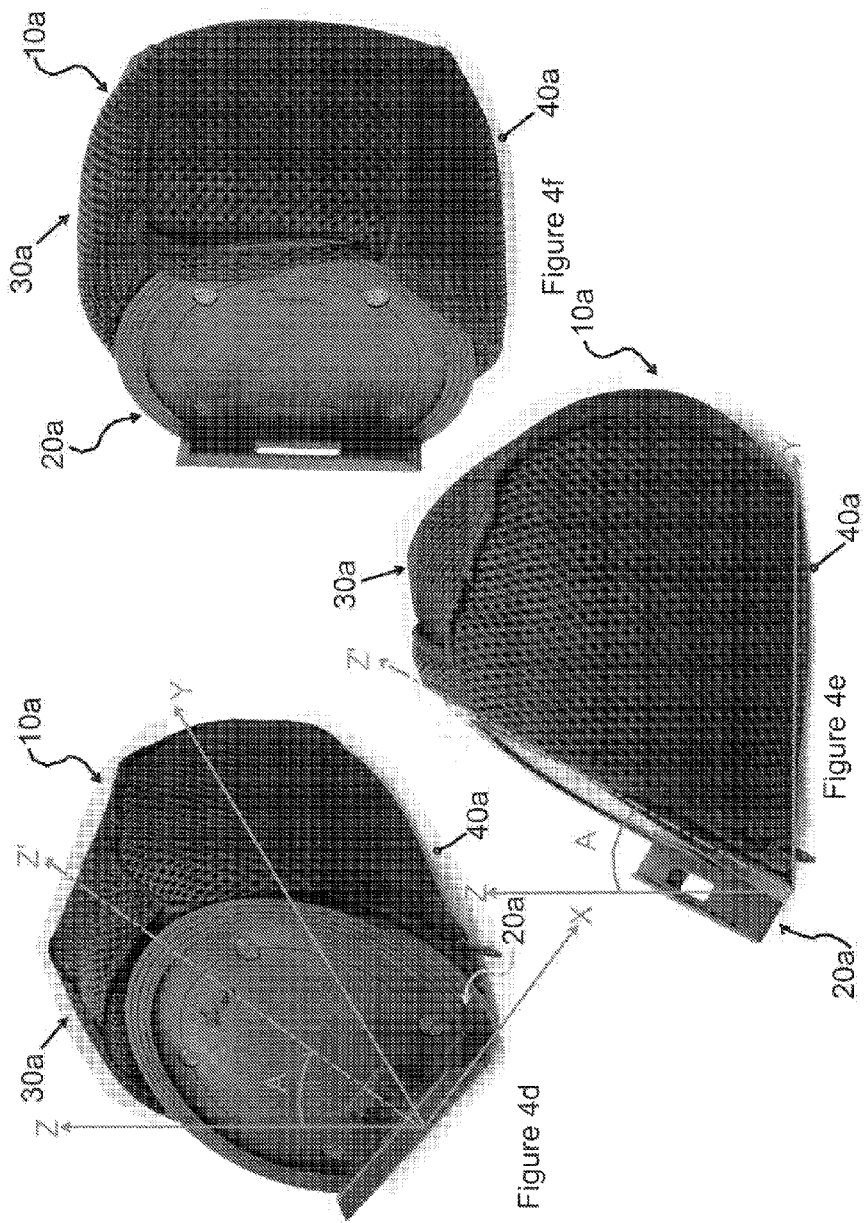

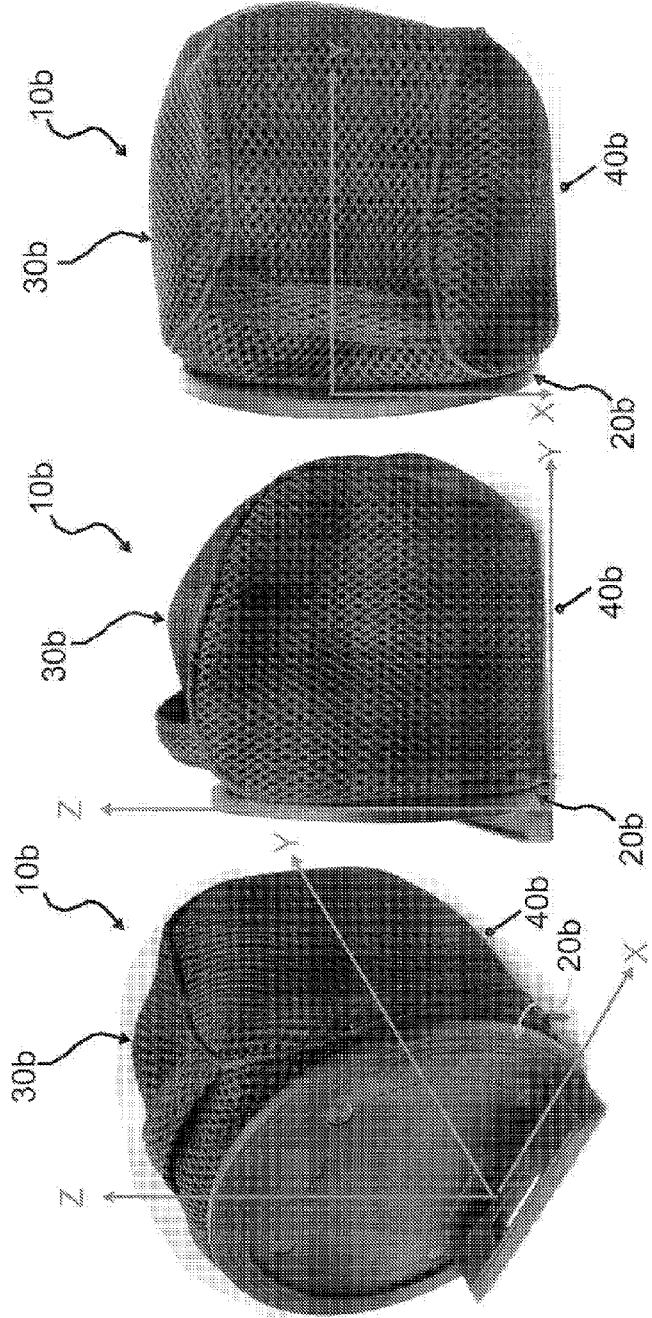

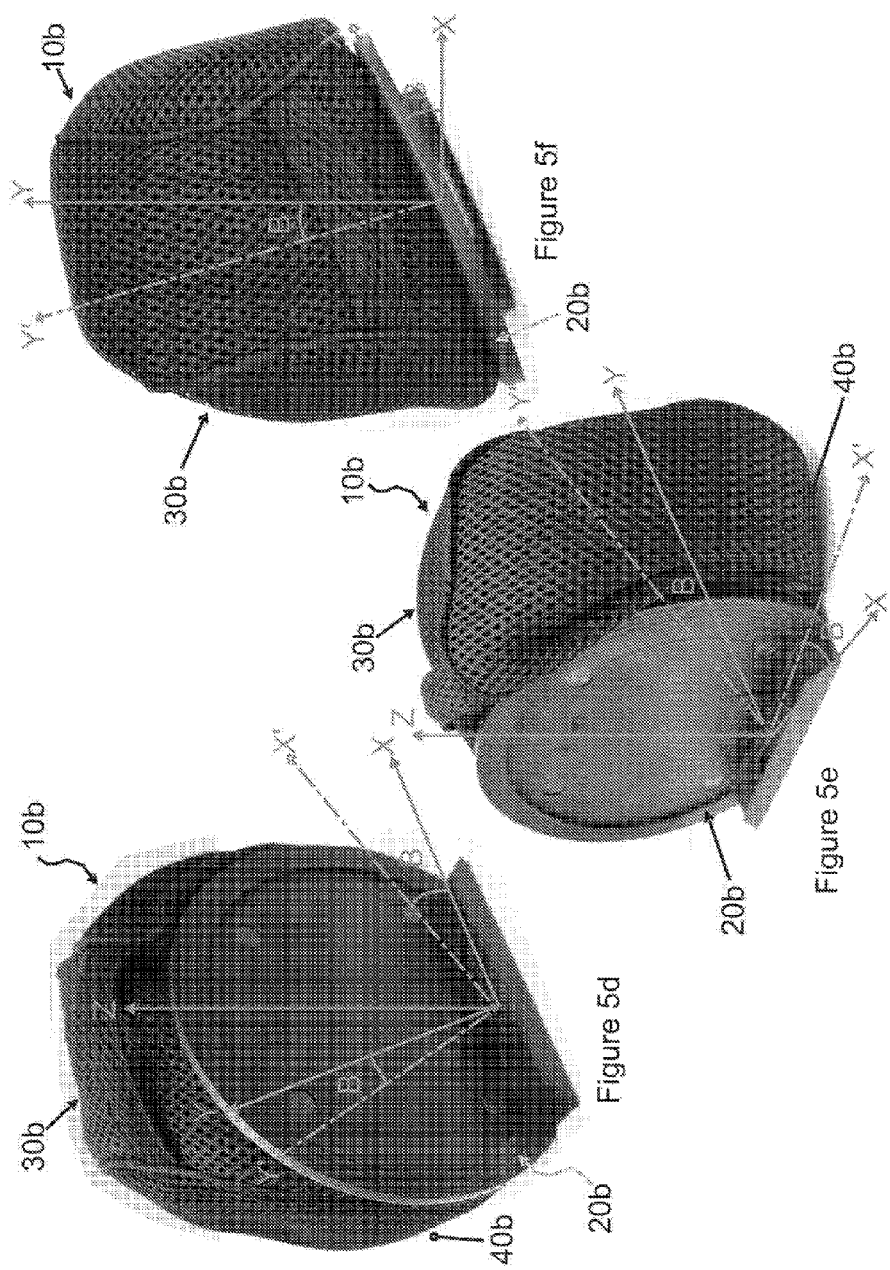

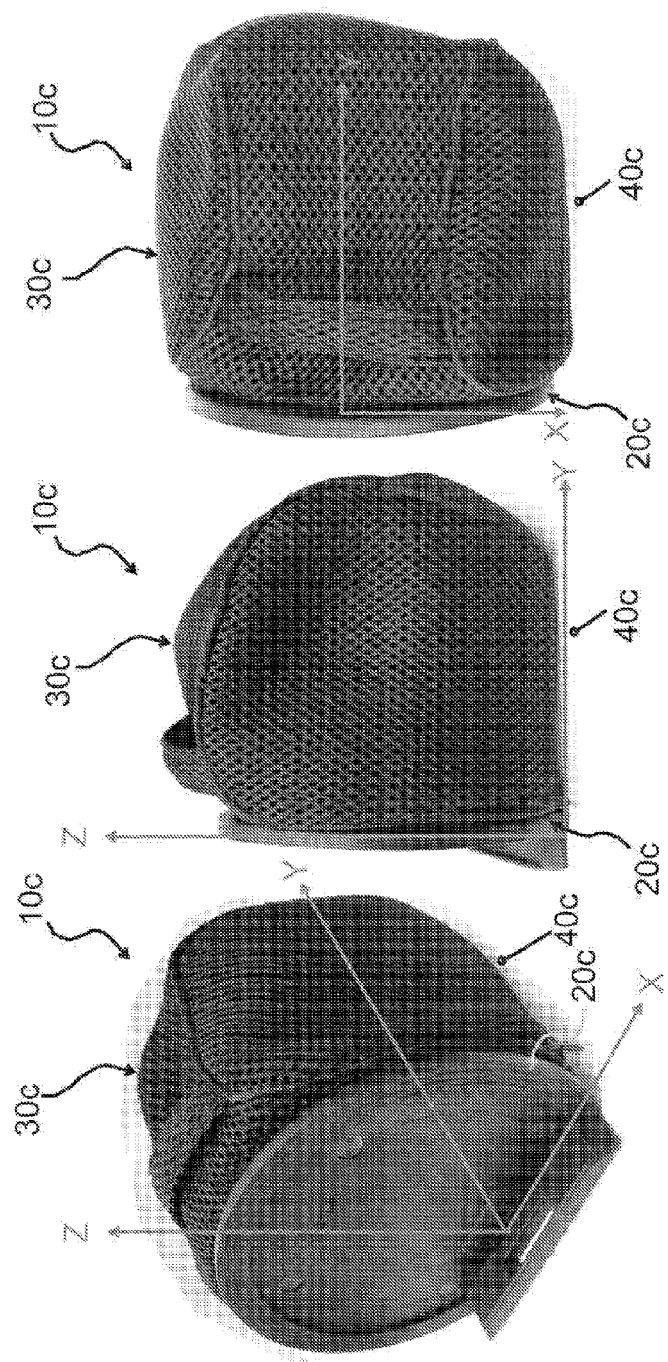

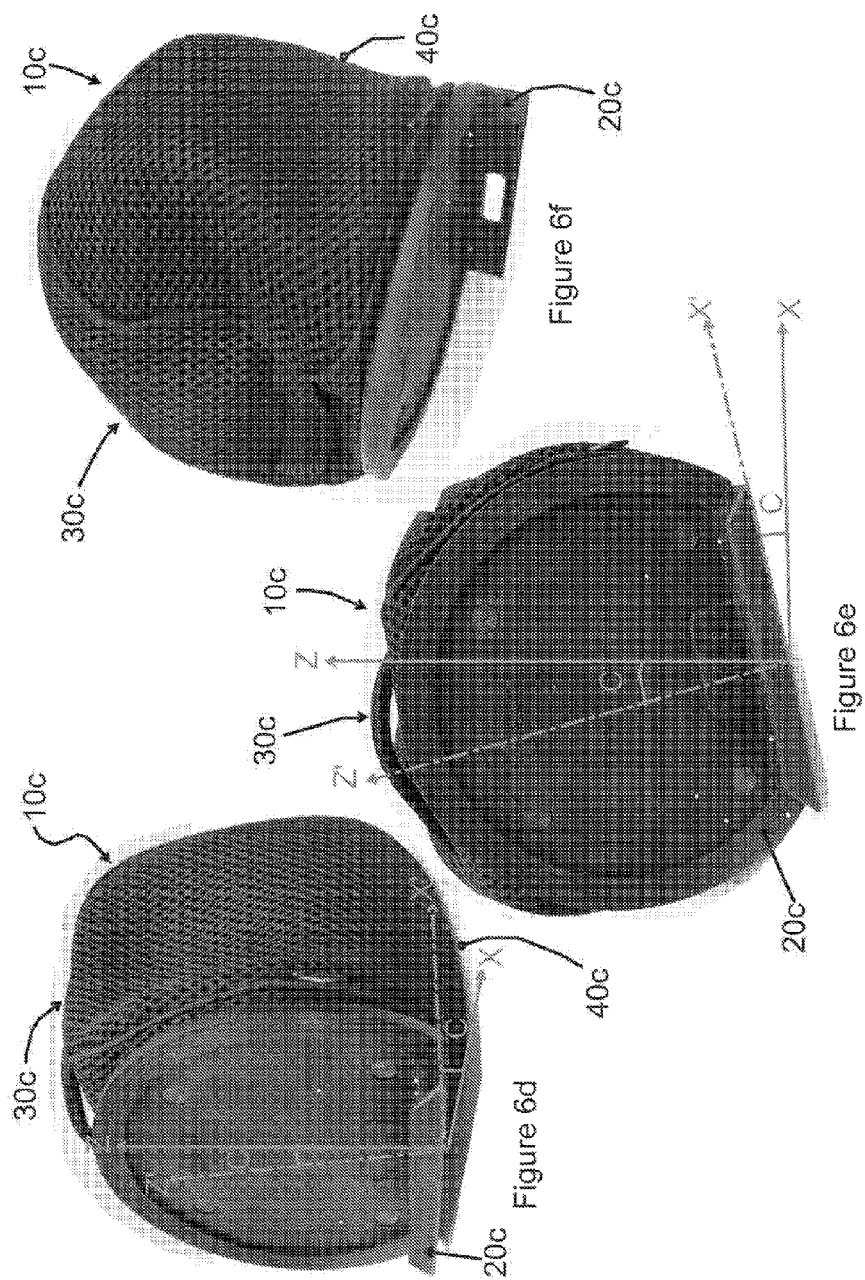

STAND FOR SUPPORTING PORTABLE ELECTRONIC DISPLAY DEVICE

FIELD OF THE INVENTION

This invention relates to portable electronic display devices, in particular to stands for supporting portable electronic display devices such as tablet computers, e-books and personal data display devices.

BACKGROUND OF THE INVENTION

Portable electronic computing devices such as laptop computers and personal tablet computers and other personal electronic display devices such as e-book readers, digital photo frames and personal games consoles provide for interaction with such computing devices at more than one location, such as in home or office locations, outdoor locations, public transport, hotels and the like Interaction with personal display devices may not be mediated with keyboards only, and may include stylus, mouse or operation through the user's fingers by way of a touch sensitive display screen on a the device.

For operation of such devices, users may operate the device with one hand while supporting the weight of the device with the other hand. During extended use in various locations which are not specifically configured for operation of display devices can create discomfort for the user. To alleviate this discomfort, the user may rest the weight of the device on a surface, although the device may still be gripped with one hand so as to maintain optimum viewing angle of the display.

In an effort to reduce the discomfort associated with operation of personal computing devices in various locations, a number of stands have been devised. These stands come in a variety of form factors including inclined stands, hinged angle adjustable platforms, kick stands (similar to picture frame stands), tripod base stands and slot type stands, some of which may be angularly adjustable.

Whilst current commercially available stands provide a variety of manners to support personal electronic devices for operation by the user, these stands typically require a flat, hard surface to rest upon and adjustment can be cumbersome and often requires manual dexterity as these stands are often structurally and mechanically rigid and may include cumbersome adjustment mechanisms.

With the increased popularity of electronic table type devices such as Apple iPad™ and other portable electronic devices such as e-book readers, the relative affordability and performance of such devices has expanded the usage of portable computing devices to include casual 'lean back' usage at home in addition in a desk or formal office environment where the computer remains at a fixed location and may be supported by the above stands.

Object of the Invention

It is an object of the present invention to provide a stand for supporting portable electronic display devices which addresses or at least substantially ameliorate some of the deficiencies associated with devices of the prior art.

SUMMARY OF THE INVENTION

In a first aspect the present invention provides an electronic display device stand for providing adjustability of a portable electronic display device at a user defined orientation relative to a support surface and maintaining the device at said user defined orientation, the stand comprising:
  an engagement portion for engagement with and support of a portable electronic display device; and
  a support portion for providing adjustability of the device to said user defined orientation and maintaining the device at said user defined orientation, said support portion including a deformable mass portion being deformable upon application of force by a user;
  wherein upon application of force by the user the deformable mass portion is deformed such that the portable electronic display device is moved toward a user defined orientation relative to the support surface, and
  upon release of said force the deformable mass maintains the portable electronic display device at the user defined orientation.

Advantageously, the deformable mass of the support portion may be further deformable responsive to the topology of the support surface for conformity with said support surface.

Preferably, the support portion may be deformable so as to provide adjustability of a portable electronic display device about one or more axes relative to the support surface.

Advantageously, the support portion is deformable so as to provide adjustability of a portable electronic display device about two or more axes relative to the support surface.

Preferably, the support portion is deformable so as to provide adjustability of a portable electronic display device about three axes relative to the support surface.

Each of said axes is preferably orthogonal to said support surface.

Preferably the orthogonal axes extend in the lateral, vertical and horizontal directions relative to the support surface.

Advantageously, the deformable mass portion of the support portion may comprise a container having an inner volume for receiving filler material.

Preferably the stand includes a deformable mass portion selected from a group including a pouch filled with a plurality of particles, an elastically deformable solid material, an elastically deformable foam, or an elastically deformable cushion.

Preferably the deformable mass portion may be a beanbag.

Advantageously, the engagement portion of the stand may comprise a rigid plate.

Preferably the stand further includes a shelf extending from the rigid plate for supporting the lower portion of the portable electronic display device.

The shelf may include an aperture sized so as to permit the passage therethrough of a charging attachment for the portable electronic display device.

Preferably the stand further includes a retaining lip for retaining the supported lower portion of the portable electronic display device in position.

The shelf may be manufactured from materials selected so as to provide friction sufficient to retain the personal electronic display device in said stand, including rubber or silicone materials.

Preferably the deformable mass is formed by a container defining an inner volume, wherein a portion of the container is placed between a first plate and a second plate, and said first and second plate are coupled together to form the engagement portion.

Optionally, the stand may include one or more protrusions extending from the surface of the deformable mass.

Advantageously, the stand may be sized so as to support an electronic book or 'e-book' device.

In a further aspect there is provided an adjustable stand for displaying and maintaining a portable electronic device at a user defined orientation comprising:

a rigid plate for engagement with and support of a portable electronic display device, a deformable mass attached to the rigid plate, wherein upon the application of force by a user to the stand the deformable mass is deformed such that the electronic personal display device is moved toward a user defined orientation relative to the support surface, and upon release of said force the user defined orientation of the portable electronic display device is maintained.

In yet a further aspect there is provided a method of forming a support device for an electronic display device: comprising coupling a deformable mass to an engagement portion for engagement with and support of a portable electronic display device, such that upon the application of force by a user to the stand the deformable mass is deformed such that the electronic personal display device is moved toward a user defined orientation relative to the support surface, and upon release of said force, the user defined orientation of the portable electronic display device is maintained. In an aspect of the present invention there is provided a support stand for a tablet computing device comprising:

a self-leveling base including a spherical shape made from soft fabric, filled with microbeads or filler material of a similar function.

In still further aspects, the base of the stand may be sewn with a non-slip piping or similar protrusion along the seam to assist with grip on the base on smooth surfaces.

The base may include a carry handle incorporated to the top surface to assist in portability.

A firm rubber or silicone shelf component (or materials with similar mechanical function and anti slip characteristics.) for interfacing with and supporting the tablet computing device. The shelf component may include a vertical backing face, and small shelf with lip across the base.

The shelf component may have a cutout below on the horizontal surface to allow for the attachment of a charging/docking cable for the tablet computing device.

The soft fabric base may be interfaced with a rubber or silicone shelf component design and used to fully support tablet computing devices in landscape or portrait format, from a horizontal to a near vertical angle of operation, whilst providing quick device re-orientation and angular incline adjustments on a self levelling base on a variety of surfaces and at various locations. The stand may include a shelf component made from rubber, silicone or materials with similar mechanical function and anti slip characteristics, affixed to the soft fabric base. The shelf component may provide resting support and grip for the personal electronic display device in operation either in landscape or portrait format.

Advantageously, as the stand does not require a securing mechanism to secure the personal electronic display device, it facilitates rapid change in mode from landscape to portrait format.

Preferably, the shelf component includes a vertical backing face that provides a flat support surface for the personal electronic display device on the front face, and a flat surface to interface to the fabric base on the back. The shelf component may include a small horizontal shelf protrusion along the bottom face of the component to rest the personal electronic display device on against a return lip to securely stop the device from slipping off the shelf. The personal electronic display device may be held in place utilizing its own weight under gravity at rest.

As used herein the term electronic display devices includes tablet computing devices (also known as tablets, tablet PCs, slate and more, operated using touch and/or a stylus), personal e-book readers, digital photo frames and personal games consoles.

BRIEF DESCRIPTION OF THE DRAWINGS

Preferred embodiments of the present invention will now be described by way of non-limiting example only with reference to the accompanying drawings in which:

FIG. 2b is a side view of the embodiment shown in FIG. 2a.

FIG. 4a is a perspective view of a further exemplary embodiment of the present invention shown in a first position.

FIG. 4b is side view of the exemplary embodiment shown in FIG. 4a in a first position;

FIG. 4c is a top view of the exemplary embodiment shown in FIG. 4a in a first position FIG. 4d is a perspective view of the exemplary embodiment of the present invention shown after rotation to a second position.

FIG. 4e is side view of the exemplary embodiment shown in FIG. 4d;

FIG. 4f is a top view of the exemplary embodiment shown in FIG. 4d;

FIG. 5a is a perspective view of a further embodiment of the present invention shown in a first position.

FIG. 5b is side view of the exemplary embodiment shown in FIG. 5a;

FIG. 5c is a top view of the exemplary embodiment shown in FIG. 5a FIG. 5d is a perspective view of the exemplary embodiment shown in FIG. 5a upon adjustment to a second position.

FIG. 5e is side view of the exemplary embodiment shown in FIG. 5d;

FIG. 5f is a top view of the exemplary embodiment shown in FIG. 5d;

FIG. 6a is a perspective view of a third embodiment of the present invention shown in a first position.

FIG. 6b is a side view of the exemplary embodiment shown in FIG. 6a;

FIG. 6c is a top view of the exemplary embodiment shown in FIG. 6a FIG. 6d is a perspective view of the exemplary embodiment shown in FIG. 6a upon adjustment to a second position.

FIG. 6e is side view of the exemplary embodiment shown in FIG. 6d;

FIG. 6f is a top view of the exemplary embodiment shown in FIG. 6d;

DETAILED DESCRIPTION OF THE PREFERRED EMBODIMENT

Figure 1:
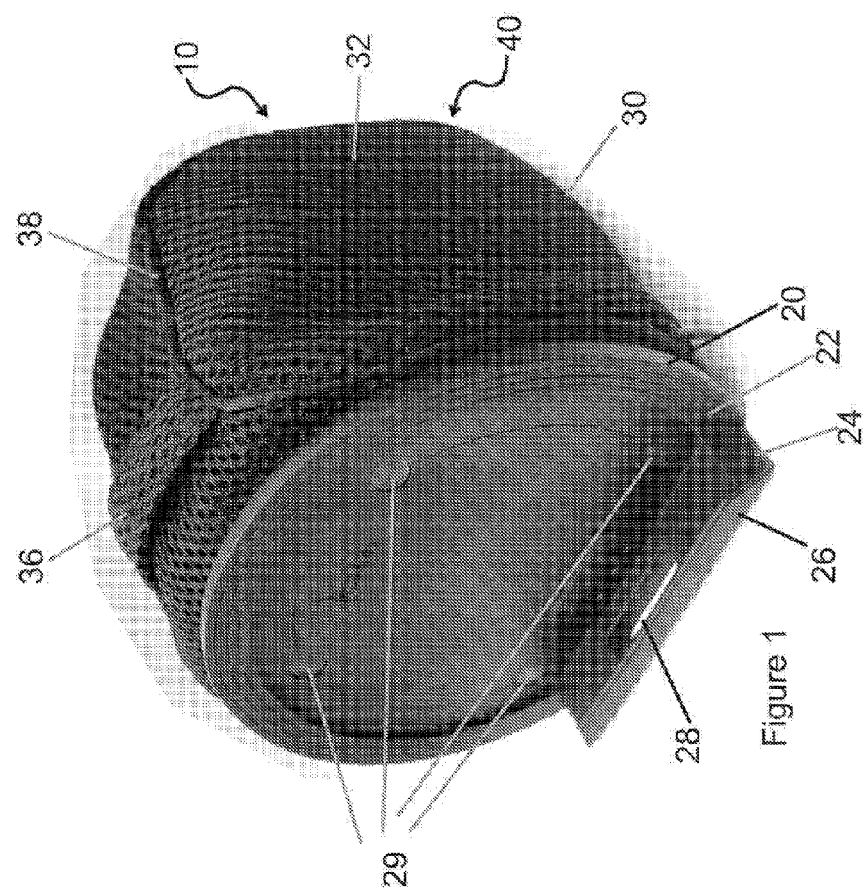
FIG. 1 is a perspective view of an exemplary embodiment of the present invention.
Figure 2B:
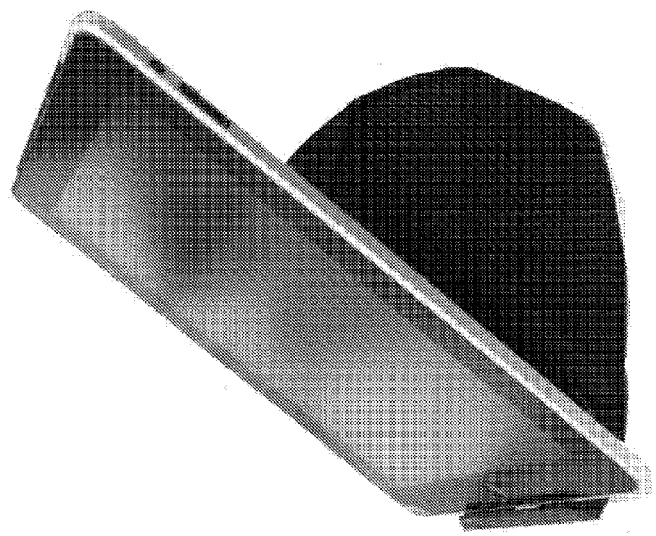
Figure 2A:
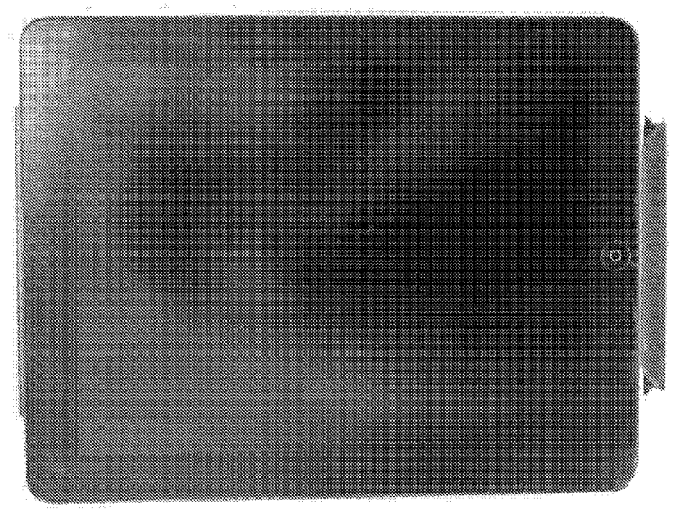
FIG. 2a is a front view of the exemplary embodiment of the present invention shown in use with an Apple IPAD™ in a portrait orientation
Figure 2D:
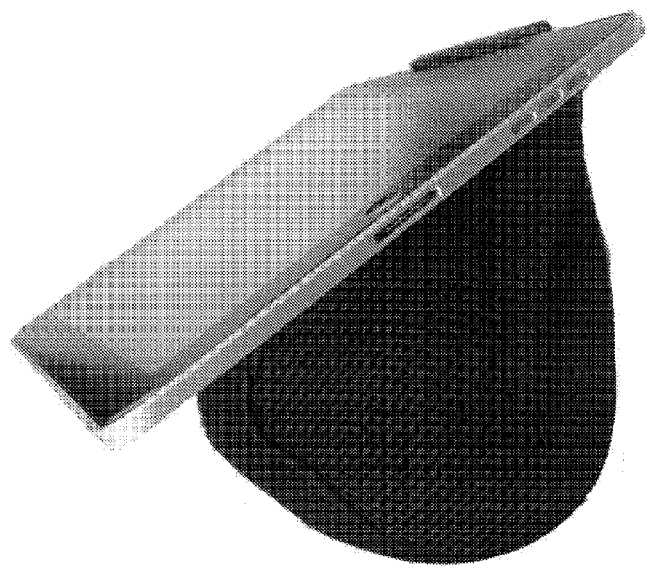
FIG. 2d is a side view of the embodiment shown in FIG. 2c.
Figure 2C:
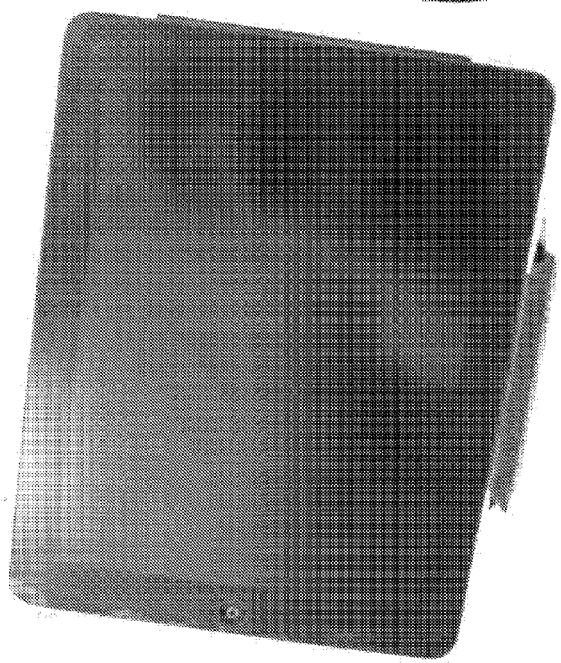
FIG. 2c is a front view of the exemplary embodiment of the present invention shown in use with an Apple IPAD™ in a landscape orientation.

The following description refers to preferred embodiments of a stand according to the present invention. To facilitate an understanding of the invention, reference is made in the description to the accompanying drawings whereby the stand is illustrated in preferred embodiments. Similar components between the embodiments are identified by the same reference numerals.

Referring to FIG. 1, FIGS. 2a-2d, FIG. 3a and FIG. 3b, an exemplary embodiment of a stand 10 of the present invention is depicted, the stand 10 comprises an engagement portion 20 and a support portion 30 for engagement and interaction with a support surface 40. The engagement portion 20 provides for engagement with a portable electronic display device as shown in FIG. 2.

The support portion 30 of the stand 10 includes a deformable mass 32 which is shown conforming substantially to a smooth support surface 40, and which allows for adjustment of the inclination of the portable electronic display device to a requisite or desired inclination, upon being deformed by a user.

Referring to FIGS. 1 to 9 there are depicted exemplary embodiments of a stand for an electronic display device in accordance with the present invention. The stand provides for adjustment to and orientation of the display device supported by the stand at various orientations.

The support portion 30 includes a deformable mass 32 which is shown conforming substantially to a smooth support surface 40. However it will be appreciated that substantial conformity to the support surface 40 would not be required, as is shown with further reference the schematic views depicted in FIG. 3a and FIG. 3b where to the device is demonstrated in a variety of settings where the support surface is not smooth.

As depicted in the embodiment of the stand 10 as shown in FIG. 1 and FIG. 2a-d, the engagement portion 20 is a rigid plate 22 which includes a shelf 24, and a retaining lip 26. As shown, the shelf 26 includes an aperture 28 which is adapted for receiving a charging attachment for the portable electronic display device (not shown). The shelf extends from the rigid plate and provides support for the lower portion of the portable electronic display device.

The rigid plate may be coupled to the support portion through the use of fasteners 29 such as screws, rivets or the like passing through the cover 33 of the support portion, as shown. A backing plate retained in the cover and attached to the support portion may be configured to 'sandwich' the material of the cover of the support portion and provide an attachment plane for attachment to the support portion. It would be appreciated that the cover 33 may alternatively be attached to the rigid plate using glue, epoxy resin or the like.

It will be appreciated that the shelf 24 and lip 26 may be made from materials selected from rubber, silicone or materials with similar frictional characteristics to assist in retention of the portable electronic display device. This material can be selected so as to provide sufficient friction for the retention of the personal electronic display device in the stand.

The shelf 24 and lip 26 may be dimensioned so as to provide support for an electronic display device in portrait or landscape orientations, and such that the orientation of the display device may be changed between these orientations as desired. Depending on the nature of the electronic device to be retained, it would be appreciated by a person skilled in the art that the shelf may be sized as appropriate. The return lip 26 can provide additional securing of the electronic display device in the stand when in the desired orientation and angular inclination.

The support portion 30 shown is substantially spherical, although a variety of other configurations of the three dimensional stand shapes such as polyhedrons, cubes and prisms may be selected depending upon user's aesthetic preferences and as appropriate to the selected electronic display device.

The support portion 30 as shown includes a deformable mass 32 which in the embodiments shown is formed within the support portion 30 by the inclusion of a container 35 filled with foam microbeads 37 and filler material. The deformable mass 32 shown in the exemplary embodiments is a beanbag.

Alternatively, it would be appreciated by a person skilled in the art that the support portion 30 could include other deformable mass types, including a pouch filled with a plurality of particles, elastically deformable foam or elastically deformable cushions or similar solid materials (not shown). It would be appreciated that these masses may or may not be included in a container, and may be directly encased within the volume defined by the support portion 30.

In the embodiments shown, the support portion 30 includes a handle 36 for ease of re-location of the stand by the user and non slip piping or protrusion 38 for assisting the retention of the support portion on a smooth surface.

Referring to FIGS. 2a-2d there is shown a number of views of an exemplary embodiment of the present invention supporting an electronic display device which is an IPAD™ in a user desired orientation.

Figure 3A:
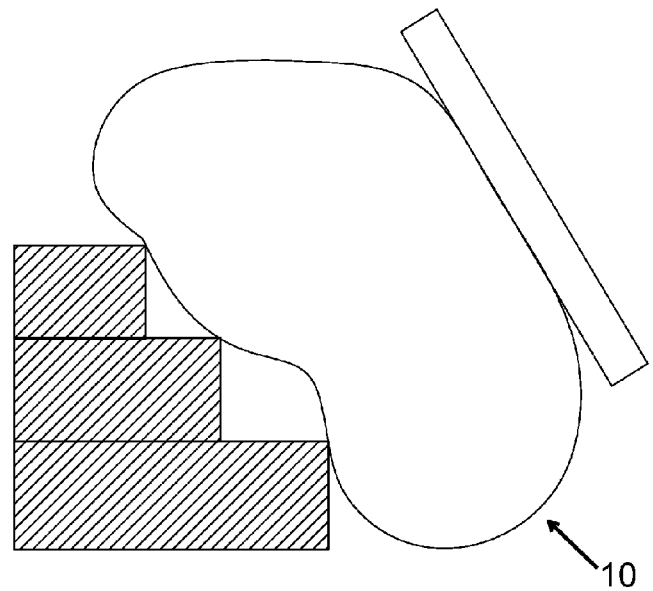
FIG. 3a is a stylised view of an embodiment of the present invention when resting upon an uneven surface
Figure 3B:
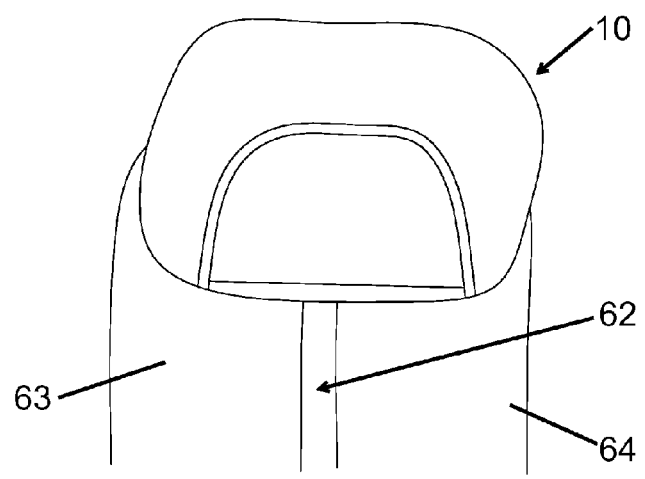
FIG. 3b is stylised top view of an embodiment of the present invention resting upon the lap of a user

As shown in FIGS. 3a,3b an embodiment of the stand 10 of the present invention provides adjustment so as to provide a level display even where the support surface topology is not smooth. In FIGS. 3a and 3b shown, the representation of a support surface includes a number of gaps and/or is not smooth.

As depicted in these Figures, the deformable mass is deformable by the application of force by a user, and may be further deformed in response to the topology of the support surface, so as to be in substantial conformity with the support surface. It would be appreciated by a person skilled in the art that it is not necessary for the deformable mass to conform entirely to the topology of the support surface. Instead, it is sufficient that the substantial conformity of the deformable mass to the surface can allows further adjustment and maintenance of the support portion at the desired orientation.

Gaps may be present in the support surface where an embodiment of the stand of the present invention is being used for example n a side table resting across a number of books of different thickness as shown in FIG. 3a, or when reclining on a sofa, or when supporting the device across the gap 62 between the legs of a user 63, 64 sitting in a chair (FIG. 3b).

The stand provides support for these arrangements provided a portion of the support surface was able to span the gaps.

As can be appreciated by a person skilled in the art, the deformable mass portion allows for the stand to be 'self levelling' when extending across uneven support surfaces including those disclosed above.

Referring to FIGS. 4a-4f, these figures show a first embodiment of a stand 10a. A frame of reference for the deformation of the support portion 30a in relation to three orthogonal axes, these being X, Y and Z axes is provided. The X and Y axes lie in a generally horizontal plane as a support surface 40a, and the Z axis extends in a normal upward direction from the support surface 40a.

Thus, in the depicted embodiment, the axes shown are in a lateral, horizontal and vertical direction relative to the support surface 40a, although as will be appreciated axes in other directions could be utilized for reference.

It can be seen that the support portion 20a has rotated away from the Z axis by angle A, to provide optimum or requisite viewing of the electronic display device (not shown). This rotation may be achieved by the application of force directly to either the support portion 20a or to the deformable mass 30a. Force may be applied directly by the user compressing the deformable mass until the desired orientation of the display device is obtained.

Alternatively, force may be applied to the deformable mass by the user applying the force to a portable electronic display device which has been retained in the stand. Still further the force may be applied to the stand by applying force to the engagement portion directly, which is transmitted through to the deformable mass for rotation until the desired orientation of the engagement portion (and the display device) is attained.

Referring to FIGS. 5a-5f there is depicted a further embodiment of a stand 10b according to the present invention. FIGS. 5a-c show an embodiment of the stand of the present invention in a first position, relative to axes X, Y, Z, prior to adjustment, while FIGS. 5d-f show the depicted embodiment of the stand of the present invention in a second position.

For ease of review, axes X, Y, Z have been included in the Figures, these axes being orthogonal to the surface 40b. It would of course be appreciated by a person skilled in the art that alternate axes could be included, which may or may not be orthogonal to each other and to the surface 40b. In the depicted embodiment, the axes shown are in lateral, horizontal and vertical directions relative to the support surface, although axes in other directions could be utilised.

As shown in FIGS. 5c-5f, in the embodiment depicted the stand has been rotated about the X axis so as to adjust the relative angle to the vertical of the support surface 40b by an amount A. The stand has also been rotated about the Z axis so as to adjust the relative angle to the Y axis by an amount B. It would be appreciated that the rotation about the axes shown in the FIGS. 5a-5f is exemplary, and the stand could be rotated about two or more axes other than those depicted in FIGS. 5a-5f.

As with the embodiment depicted in FIGS. 4a-4f, with reference to the embodiment shown in FIGS. 5a-5f, the adjustment of the orientation of the support surface to provide the desired orientation of the device may be achieved by the application of force directly to either the support portion 20b or to the deformable mass 30b. Force may be applied directly by the user compressing the deformable mass until the desired orientation of the display device is obtained.

Alternatively, force may be applied to the deformable mass by the user applying the force to a portable electronic display device which has been retained in the stand. Still further the force may be applied to the stand by applying force to the engagement portion directly, which is transmitted through to the deformable mass for rotation until the desired orientation of the engagement portion (and the display device) is attained.

The stand is retained at the desired orientation when the adjustment force ceases, through support provided by the deformable mass portion 32b of the support portion 30b to the engagement portion.

Referring to FIGS. 6a-6f there is shown still a further embodiment of the stand 10c of the present invention. FIGS. 6a-c show the further embodiment 10c in a first position, relative to axes X, Y, Z, prior to adjustment, while FIGS. 6d-f show the depicted embodiment of the stand in a second position following adjustment.

As shown in FIGS. 6d-6f, in the embodiment depicted, the stand 10c has been rotated about the X axis so as to adjust the relative angle to the vertical of the support surface 20c by an amount A (not shown). The stand has also been rotated about the Y axis so as to adjust the relative angle formed by the device with the Z axis by an amount C. The stand has also been rotated about the Z axis to change the orientation relative to the X axis by the angle C. It would be appreciated that the rotation about the axes shown in the FIGS. 6a-6f is exemplary, and the stand could be rotated about three or more axes other than those depicted in FIGS. 6a-6f.

Adjustment relative to the three axes allows for the user to achieve the desired orientation, with respect to glare considerations, ease of review and use in a reclining or recumbent position. It will be appreciated that although the axes depicted in the Figure are orthogonal to each other and with respect to the surface, these axes are for ease of reference only and alternative axes may be selected. For example, in the depicted embodiment, the axes shown lateral, horizontal and vertical direction relative to the support surface, however axes in other directions could be utilised.

The stand may be further adjusted by rotation of the entire device on the support surface to provide optimised viewing of the electronic display device in relaxed recumbent or seated positions.

Similarly, as with the previous embodiments, rotation of the stand about the axes may be effected successively or simultaneously through the application of direct or indirect force to the stand. As shown in FIGS. 6a-6f force may also be applied about three axes relative to the support surface so as to orient the stand as required in a particular three dimensional orientation. The force may be applied about axes which may be orthogonal to each other or the support surface, and these axes may extend laterally, horizontally or vertically relative to the support surface as shown in the Figures.

A person skilled in the art would understand that the various positions of the embodiments shown in FIGS. 4-6 of the embodiments provide for an adjustable stand which may be incrementally angularly adjusted about one or more of a plurality of axes, directly or indirectly, so as to provide the optimum viewing angle for the viewer of the electronic display device received in the stand.

Figure 7:
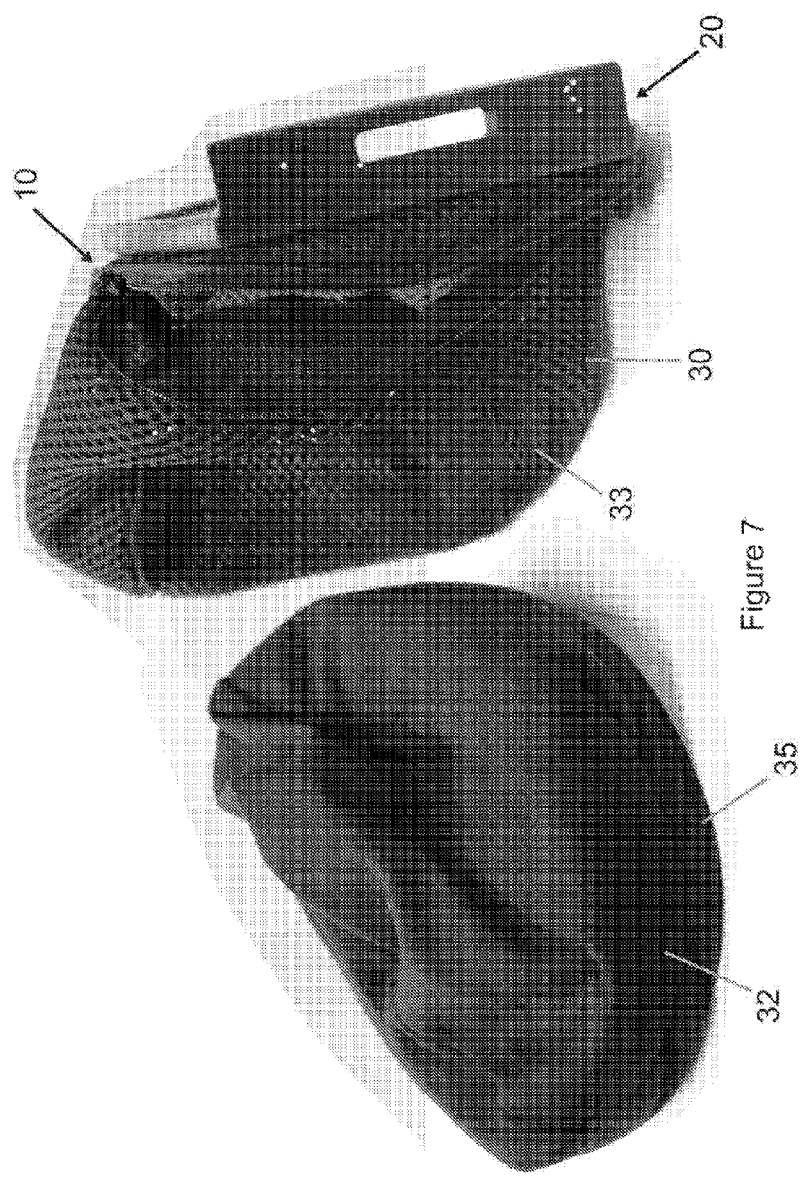
FIG. 7 is an exploded view of the exemplary embodiment depicted in FIG. 1.

Referring to the embodiment depicted in FIG. 7, it can be seen that the support portion 30 of the stand 10 includes a deformable mass 32 comprising a fabric cover 35 which includes micro-beads or particles (not shown). In the embodiment shown the deformable mass is a bean bag, however, as noted above, other materials may be used to form the deformable mass.

Figure 8:
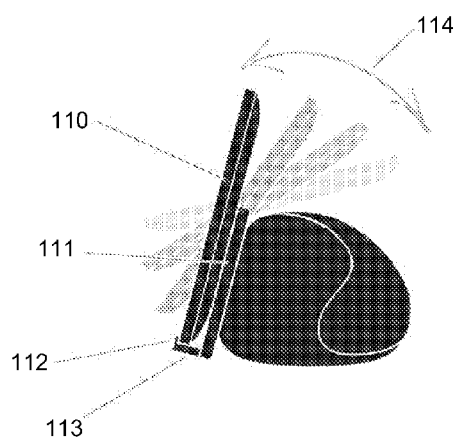
FIG. 8 is a stylised side view of the embodiment of FIG. 1 of the present invention illustrating adjustments to the viewing angle.

The range of adjustment that may be provided by an embodiment of the stand of the present invention can be seen with reference to FIG. 8 which is a stylised depiction of the various orientations 114. It can be seen that the electronic display device 110 rest upon shelf 113 and lip 112 against the supporting portion 111 under its own weight. As shown in the various orientations 114 possible, the stand is both readily removable and easily adjusted in its orientation from relaxed to substantially recumbent position.

The stylised device shown is representative of an Apple™ IPAD™ electronic display device, although it would be appreciated that the stand is similarly applicable to other types of electronic display devices.

Figure 9:
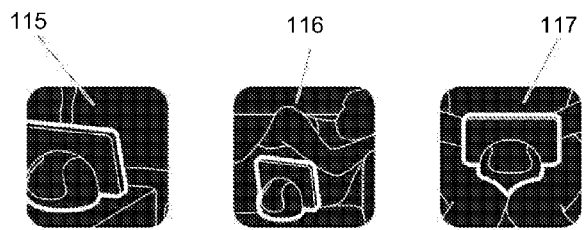
FIG. 9 shows stylised diagrams illustrating various positions and location of use for an embodiment of the present invention.

FIG. 9 shows exemplary stylised settings in which the adjustable stand of the present invention may be utilised, including on coffee or other tables 115, sofa or bedside 116 and on the user's lap 117. The wide range of angular adjustment provided by the stand can be selected such that the optimum orientation and viewing angle of the portable electronic display device can be provided for these and other settings.

The stand of the present invention provides advantages over those of the prior art, in that the stand may be used to provide adjustment by a user irrespective of the requisite or desired viewing angle, whereby adjustment by user is not limited by any pre-set angles of inclination provided by the stand. Furthermore, irrespective of the orientation or inclination of a support surface, the stand provides a user with adjustability of viewing angle. Further, irrespective of the topology of a support surface, the stand provides for stable engagement with the support surface, without being unwieldy or unstable.

The stand according to the present invention provides stability in use for viewing, as well as stability upon interaction of a use with an electronic display device being supported by the stand, without toppling or being unwieldy when a user may use a hand or finger to operate the electronic device's touch sensitive display panel, and without altering the desired viewing angle of the device.

The stand according to the present invention offers versatility of providing adjustability of the viewing angle of an electronic display device and provides stable support of such a device during viewing and manual interaction therewith, irrespective of the desired viewing angle and irrespective of the topology of a support surface upon which the stand is to rest. Thus, the stand according to the present invention provides versatility of usage of portable electronic display devices in a variety of locations, thus increasing safety and ease of use, and expansion of location of use of such portable electronic display device for greater utilization of such devices.

As will be understood and appreciated by those skilled in the art, the term electronic display devices referred to throughout the description includes tablet computing devices (also known as tablets, tablet PCs, slate and more, operated using touch and/or a stylus), personal e-book readers, digital photo frames and personal games consoles.

The invention claimed is:

1. An electronic display device stand for providing adjustability of a portable electronic display device at a user defined orientation relative to a support surface and maintaining the portable electronic display device at said user defined orientation, the portable electronic display device possessing a display plane, the stand comprising:
   an engagement portion for engagement with and support of a portable electronic display device; and
   a support portion for providing adjustability of the portable electronic display device to said user defined orientation and maintaining the portable electronic display device at said user defined orientation, said support portion including a deformable mass portion being deformable upon application of force by a user, and the deformable mass being formed by a container defining an inner volume, wherein a portion of the container is placed between a first plate and a second plate, and said first and second plates are coupled together to form the engagement portion;
   wherein the deformable mass portion is deformable such that upon application of a force by the user the portable electronic display device is moved toward a user defined orientation relative to the support surface, said user defined orientation being such that the display plane is in a range from perpendicular to the support surface to inclined relative to the support surface, and upon release of said force the deformable mass maintains the portable electronic display device at the user defined orientation.

2. A stand according claim 1, wherein the deformable mass of the support portion is further deformable responsive to the topology of the support surface for conformity with said support surface.

3. A stand according to claim 1, wherein the support portion is deformable so as to provide adjustability of a portable electronic display device about one or more axes relative to the support surface.

4. A stand according to claim 3, wherein each of said axes are one of three axes orthogonal to said support surface.

5. A stand according to claim 4, wherein said orthogonal axes extend in the lateral, vertical and horizontal directions relative to the support surface.

6. A stand according to claim 1, wherein the support portion is deformable so as to provide adjustability of a portable electronic display device about two or more axes relative to the support surface.

7. A stand according to claim 1, wherein the support portion is deformable so as to provide adjustability of a portable electronic display device about three axes relative to the support surface.

8. A stand according to claim 1 wherein the deformable mass portion of the support portion comprising the container having the inner volume contains filler material.

9. A stand according to claim 1 wherein the deformable mass portion is selected from a group including a pouch filled with a plurality of particles, an elastically deformable solid material, an elastically deformable foam, or an elastically deformable cushion.

10. A stand according to claim 1 wherein the deformable mass portion is a beanbag.

11. A stand according to claim 1 wherein the engagement portion comprises a rigid plate.

12. A stand according to claim 11 further including a shelf extending from the rigid plate for supporting the lower portion of the portable electronic display device.

13. A stand according to claim 12 wherein the shelf includes an aperture sized so as to permit the passage therethrough of a charging attachment for the portable electronic display device.

14. A stand according to claim 13 wherein the shelf further includes a retaining lip for retaining the supported lower portion of the portable electronic display device in position.

15. A stand according to claim 11 wherein the shelf is manufactured from materials selected so as to provide friction sufficient to retain the portable electronic display device in said stand.

16. A stand according to claim 11 wherein the shelf is selected from the group including rubber or silicone materials.

17. A stand according to claim 1 wherein one or more protrusions extend from the surface of the deformable mass.

18. A stand according to claim 1 wherein the stand is sized so as to support an electronic book or 'e-book' device.

* * * * *